United States Patent
Abrahams et al.

(10) Patent No.: US 10,334,103 B2
(45) Date of Patent: Jun. 25, 2019

(54) MESSAGE TRANSLATION FOR COGNITIVE ASSISTANCE

(71) Applicant: International Business Machines Corporation, Armonk, NY (US)

(72) Inventors: Faried Abrahams, Laytonsville, MD (US); Amol A. Dhondse, Pune (IN); Anand Pikle, Pune (IN); Gandhi Sivakumar, Melbourne (AU); Susan L. Sylvia, El Dorado Hills, CA (US)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 15/414,704

(22) Filed: Jan. 25, 2017

(65) Prior Publication Data

US 2018/0213083 A1 Jul. 26, 2018

(51) Int. Cl.
| | |
|---|---|
| *H04M 3/436* | (2006.01) |
| *H04M 1/725* | (2006.01) |
| *G06F 17/28* | (2006.01) |
| *G06F 17/27* | (2006.01) |
| *H04M 7/00* | (2006.01) |

(52) U.S. Cl.
CPC ........ *H04M 3/436* (2013.01); *G06F 17/2785* (2013.01); *H04M 1/72547* (2013.01); *H04M 1/7253* (2013.01); *H04M 7/0042* (2013.01); *H04M 2203/2038* (2013.01)

(58) Field of Classification Search
CPC . G06F 1/163; H04M 3/5116; H04M 1/72597; H04W 4/22; H04W 68/005; H04B 1/385; A61B 5/681; A61B 5/02438
See application file for complete search history.

(56) References Cited

U.S. PATENT DOCUMENTS

| | | |
|---|---|---|
| 5,634,084 A | 5/1997 | Malsheen et al. |
| 6,601,012 B1 | 7/2003 | Horvitz et al. |
| 6,879,956 B1 | 4/2005 | Honda et al. |

(Continued)

FOREIGN PATENT DOCUMENTS

| | | |
|---|---|---|
| EP | 2512116 A1 | 10/2012 |
| WO | 0159741 A1 | 8/2001 |
| WO | 2007067878 A2 | 6/2007 |

OTHER PUBLICATIONS

Giyanani et al., "Spam Detection using Natural Language Processing", IOSR Journal of Computer Engineering, vol. 16, Issue 5, Ver. IV, Sep.-Oct. 2014, pp. 116-119.

(Continued)

*Primary Examiner* — Liton Miah
(74) *Attorney, Agent, or Firm* — Scott S. Dobson; Hunter E. Webb; Keohane & D'Alessandro PLLC

(57) ABSTRACT

Approaches presented herein enable managing an incoming communication on a communication device from a communication channel. Specifically, the incoming communication is received and analyzed to determine, based on a context of the incoming communication, a situational pattern from among a plurality of situational pattern models. Based on the determined situational pattern, a criticality level is identified. One or more prompts from among a plurality of prompts are transmitted to a wearable device based on the criticality level for display to provide notification to a user of the criticality of the incoming communication.

20 Claims, 6 Drawing Sheets

(56) References Cited

U.S. PATENT DOCUMENTS

| | | |
|---|---|---|
| 6,915,254 B1 | 7/2005 | Heinze et al. |
| 7,062,440 B2 | 6/2006 | Brittan et al. |
| 7,216,073 B2 | 5/2007 | Lavi et al. |
| 7,496,230 B2 | 2/2009 | Chen et al. |
| 7,743,340 B2 | 6/2010 | Horvitz et al. |
| 7,886,222 B2 | 2/2011 | Bagare et al. |
| 7,975,015 B2 | 7/2011 | Horvitz et al. |
| 8,024,415 B2 | 9/2011 | Horvitz et al. |
| 8,031,943 B2 | 10/2011 | Chen et al. |
| 8,429,141 B2 | 4/2013 | Brun et al. |
| 8,589,148 B2 | 11/2013 | Atallah et al. |
| 8,751,500 B2 | 6/2014 | Duarte et al. |
| 9,055,279 B2 | 6/2015 | Ferguson |
| 2002/0184029 A1 | 12/2002 | Brittan et al. |
| 2008/0154595 A1 | 6/2008 | Nelken |
| 2015/0222576 A1* | 8/2015 | Anderson ............ G06F 9/4443 715/752 |
| 2015/0266377 A1* | 9/2015 | Hampiholi ............ B60K 35/00 455/466 |
| 2015/0331666 A1* | 11/2015 | Bucsa .................... G10L 15/30 704/275 |
| 2016/0094700 A1* | 3/2016 | Lee ....................... H04W 8/245 455/419 |
| 2016/0154892 A1 | 6/2016 | Carrier et al. |
| 2016/0156578 A1 | 6/2016 | Allen et al. |
| 2016/0182430 A1 | 6/2016 | Sachidanandam et al. |
| 2016/0259491 A1* | 9/2016 | Jacobs ................. G06F 3/0481 |
| 2016/0352887 A1* | 12/2016 | Na .................... H04M 1/72527 |
| 2017/0118789 A1* | 4/2017 | Lee ....................... H04W 8/245 |
| 2018/0009442 A1* | 1/2018 | Spasojevic ............ B60K 28/02 |

OTHER PUBLICATIONS

Kang et al., "Natural Language Processing Technologies for Multi-Level Intelligent Spam Mail-Filter", International Journal of Machine Learning and Computing, vol. 4, No. 3, Jun. 2014, pp. 271-274.

* cited by examiner

| SITUATIONAL PATTERN ID | SITUATIONAL PATTERN | CRITICALITY LEVEL ID |
|---|---|---|
| 100 | ADMITTED TO HOSPITAL | 100 |
| 101 | CAR ACCIDENT | 100 |
| 102 | CAR BROKEN DOWN | 100 |
| 103 | FINANCIAL CONCERN | 101 |
| 104 | ARRIVAL OF RELATIVES | 101 |
| 105 | INFORMATION ABOUT PAST OR FUTURE EVENTS | 102 |
| 106 | CASUAL CONVERSATION | 102 |

FIG. 4A

| CRITICALITY LEVEL ID | CRITICALITY LEVEL | TAX PROMPT | COLOR PROMPT |
|---|---|---|---|
| 100 | 1 | URGENT | RED |
| 101 | 2 | IMPORTANT | YELLOW |
| 102 | 3 | NORMAL | GREEN |

FIG. 4B

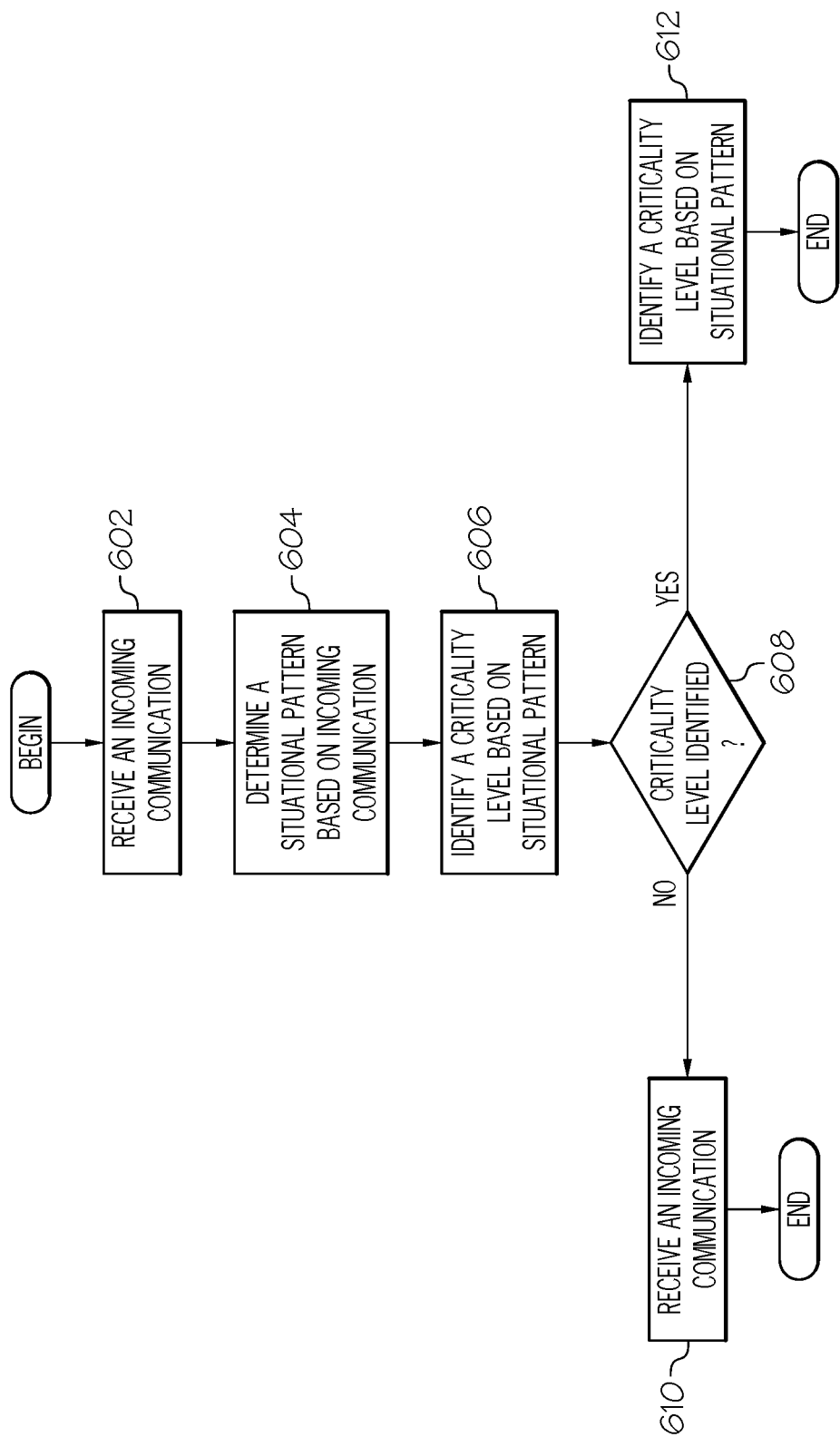

MESSAGE TRANSLATION FOR COGNITIVE ASSISTANCE

TECHNICAL FIELD

This invention relates generally to message processing systems and, more specifically, to analyzing an incoming communication to determine a criticality level of the incoming communication and providing a prompt to a user based on the criticality level.

BACKGROUND

The advent of social networking, instant messaging, and ubiquitous wireless data networks allows individuals to select from a plurality of methods to communicate with their contacts. In the past, communications between individuals were limited to physical mail, wired telephones, fax, and wireless telephones. However, with the expansion of the Internet, coupled with mobile devices capable of maintaining a data connection to the Internet, users may be able to select from a plethora of communications means, such as: cellular phone calls, email to multiple accounts, multiple instant messaging protocols, twitter messages, video chats, Short Messaging Service (SMS) and Multimedia Messaging Service (MMS) messages, social networking messages, voicemail, and the like. Typically, users are less concerned by the actual communication mode used with their contacts, and more concerned with the content of the communication conveyed.

SUMMARY

In general, embodiments of the present invention provide for managing an incoming communication on a communication device from a communication channel. Specifically, the incoming communication is received and analyzed to determine, based on a context of the incoming communication, a situational pattern from among a plurality of situational pattern models. Based on the determined situational pattern, a criticality level is identified. One or more prompts from among a plurality of prompts are transmitted to a wearable device based on the criticality level for display to provide notification to a user of the criticality of the incoming communication.

One aspect of the present invention includes a computer-implemented method for managing communications, the method comprising: receiving an incoming communication on a communication device from a communication channel; analyzing the incoming communication to determine a context of the incoming communication; determining, based on the context of the incoming communication, a situational pattern from among a plurality of situational pattern models; identifying, based on the determined situational pattern, a criticality level; and transmitting, for display on a wearable device, one or more prompts from among a plurality of prompts to the wearable device based on the criticality level.

Another aspect of the present invention includes a computer program product for managing communications, the computer program product comprising a computer readable storage medium having program instructions embodied therewith, the program instructions executable by a processor to: receive an incoming communication on a communication device from a communication channel; analyze the incoming communication to determine a context of the incoming communication; determine, based on the context of the incoming communication, a situational pattern from among a plurality of situational pattern models; identify, based on the determined situational pattern, a criticality level; and transmit, for display on a wearable device, one or more prompts from among a plurality of prompts to the wearable device based on the criticality level.

Yet another aspect of the present invention includes a computer system for managing communications, the computer system comprising: a memory medium comprising program instructions; a bus coupled to the memory medium; and a processor for executing the program instructions, the instructions causing the system to: receive an incoming communication on a communication device from a communication channel; analyze the incoming communication to determine a context of the incoming communication; determine, based on the context of the incoming communication, a situational pattern from among a plurality of situational pattern models; identify, based on the determined situational pattern, a criticality level; and transmit, for display on a wearable device, one or more prompts from among a plurality of prompts to the wearable device based on the criticality level.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 4A shows an example data structure 240 for implementing situational pattern repository 170 according to illustrative embodiments;

FIG. 4B shows an example data structure 250 for implementing criticality level repository 172 according to illustrative embodiments;

FIG. 6 shows a process flowchart 600 for managing an incoming communication by determining a criticality level of the incoming communication and providing a prompt to a user based on the criticality level according to illustrative embodiments.

Figure 1:
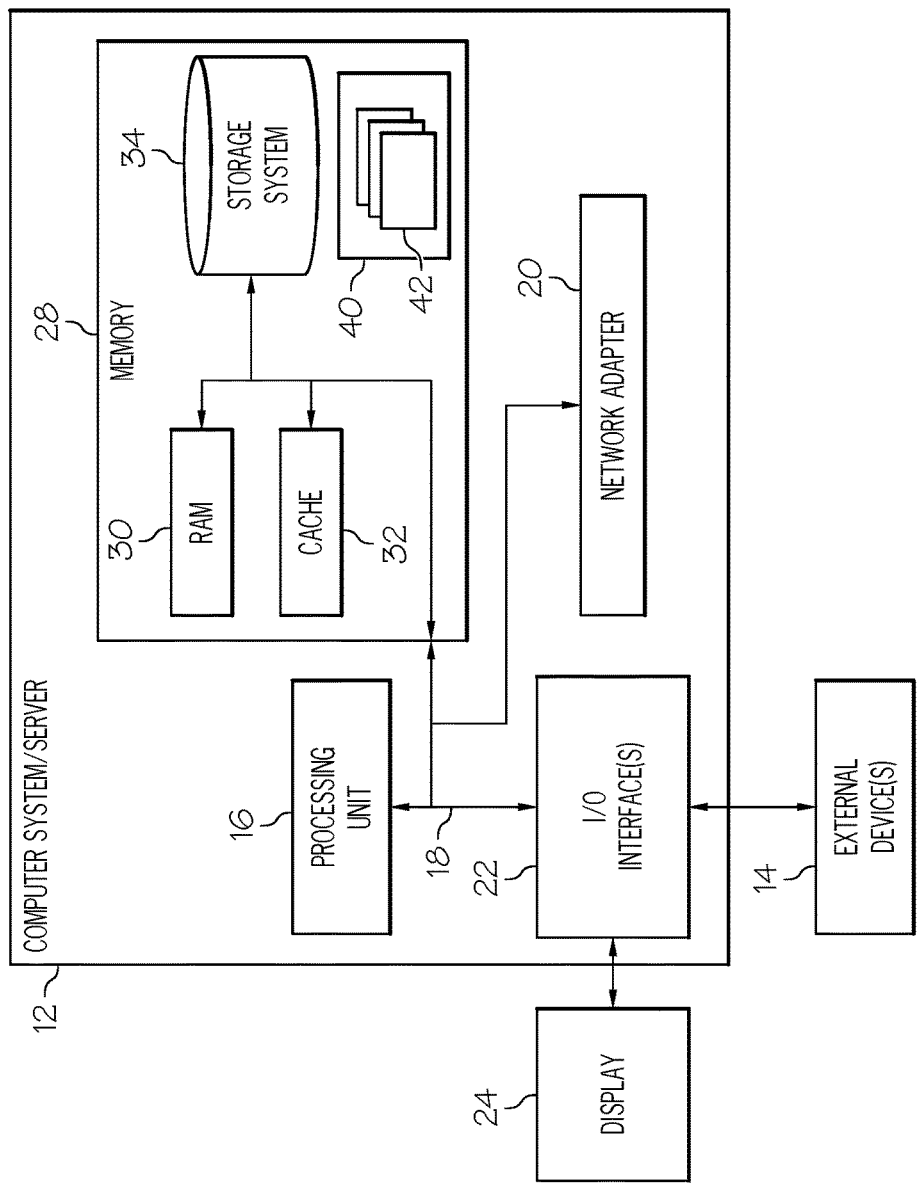
FIG. 1 shows an architecture 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention provide for managing an incoming communication on a communication device from a communication channel. Specifically, the incoming communication is received and analyzed to determine, based on a context of the incoming communication, a situational pattern from among a plurality of situational pattern models. Based on the determined situational pattern, a criticality level is identified. One or more prompts from among a plurality of prompts are transmitted to a wearable device based on the criticality level for display to provide notification to a user of the criticality of the incoming communication.

A cognitive assistant leverages cognitive computing technologies to perform tasks and offers services to assist a person in decision-making. A cognitive computing system makes context computable. It can identify and extract context features (e.g., timing, locations, tasks, profiles, etc.) to present an information set that is appropriate for an individual, or for a dependent application engaged in a specific process, at a definite time and place. In simple terms, the intent is to successfully build a system that can learn, think, and understand like a human.

The inventors of the invention described herein have recognized certain deficiencies in known methods for receiving incoming communication on an electronic device. When an incoming communication is received via an SMS channel or other messaging service, a user's visual attention is drawn to the electronic device requiring the user to read the message to determine its criticality or importance. This might be difficult at times, such as when the user is driving or attending an important meeting requiring the user's full attention. If the message is not time critical, the user would likely prefer to defer his/her attention to the message.

For example, a son may not be able to respond to a text message from his mother if he is attending an important work meeting. The son may wish to respond to his mother, but only after the meeting if a critical situation (e.g., an emergency) does not exist. However, if a situation exists requiring immediate attention, the son would want to answer or respond to the text message immediately. The approaches described herein provide a cognitive assistant tool which analyzes the incoming communication to identify a criticality level and translates this to a prompt based on the criticality which may be displayed to the user via a display element, such as a display screen on a wearable device or other electronic device. As used herein, a prompt may include text, one or more colors, one or more symbols, one or more icons, or the like. For this disclosure, discussion of prompts has been limited to text and colors for simplicity.

Referring now to FIG. 1, a computerized implementation 10 of an embodiment for managing an incoming communication by determining a criticality level of the incoming communication and providing a prompt to a user based on the criticality level will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types.

In this particular example, computer system/server 12 represents an illustrative system for managing an incoming communication by determining a criticality level of the incoming communication and providing a prompt to a user based on the criticality level. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for managing an incoming communication by determining a criticality level of the incoming communication and providing a prompt to a user based on the criticality level, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
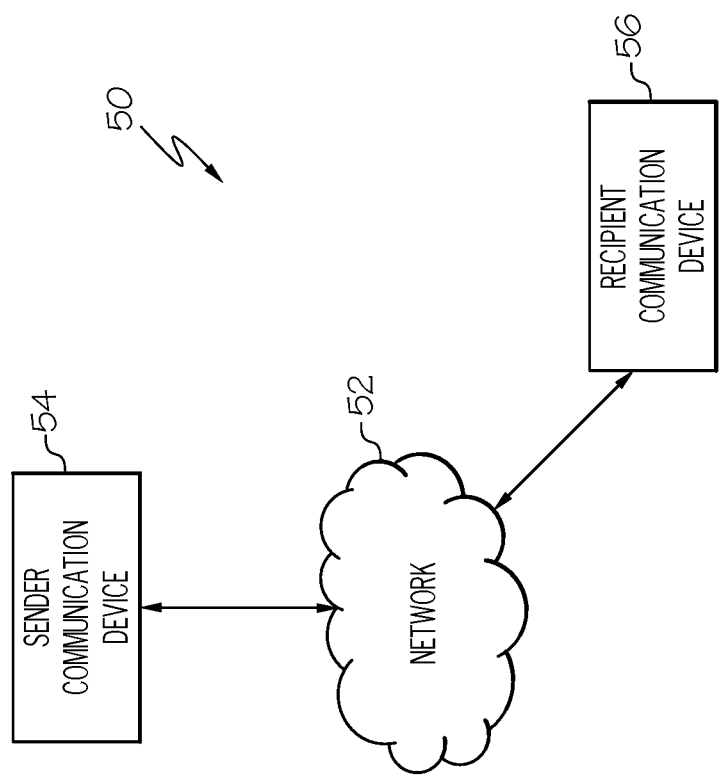
FIG. 2 shows a generic system diagram 50 in which a communication device receiving a communication is shown in an exemplary communication environment according to illustrative embodiments.

FIG. 2 illustrates a generic system diagram 50 in which a communication device (e.g., recipient communication device 56) receiving an incoming communication via a communication channel is shown in an exemplary communication environment. As shown in FIG. 2, an embodiment of a system in accordance with an example embodiment may include wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques, or the like.

As such, sender communication device 54 and recipient communication device 56 may be enabled to communicate with network 52 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS), and/or the like, may be supported as well as wireless access mechanisms such as WLAN, WiMAX, and/or the like, and fixed access mechanisms such as Digital Subscriber Line (DSL), cable modems, Ethernet, and/or the like.

In example embodiments, recipient communication device 56 may include, but is not limited to, a smart phone, a cellular phone, a Voice over Internet Protocol (VoIP) phone, a personal data assistant (PDA), a personal entertainment device, a tablet, or any other communication device capable of establishing a phone call and/or communication message session over network 52. In an exemplary embodiment, recipient communication device 56 may employ a computer system (e.g., computer system 12 of FIG. 1) capable of employing embodiments of the invention.

Similarly, sender communication device 54 may include, but is not limited to, a smart phone, a cellular phone, a Voice over Internet Protocol (VoIP) phone, a personal data assistant (PDA), a tablet, or any other communication device capable of establishing a phone call and/or communication message session over network 52. Alternatively, sender communication device 54 may include a server device, such as a mobile application server. Messages, such as notifications, may be transmitted to sender communication device 54 from a mobile application server related to a mobile application installed on sender communication device 54.

Figure 3:
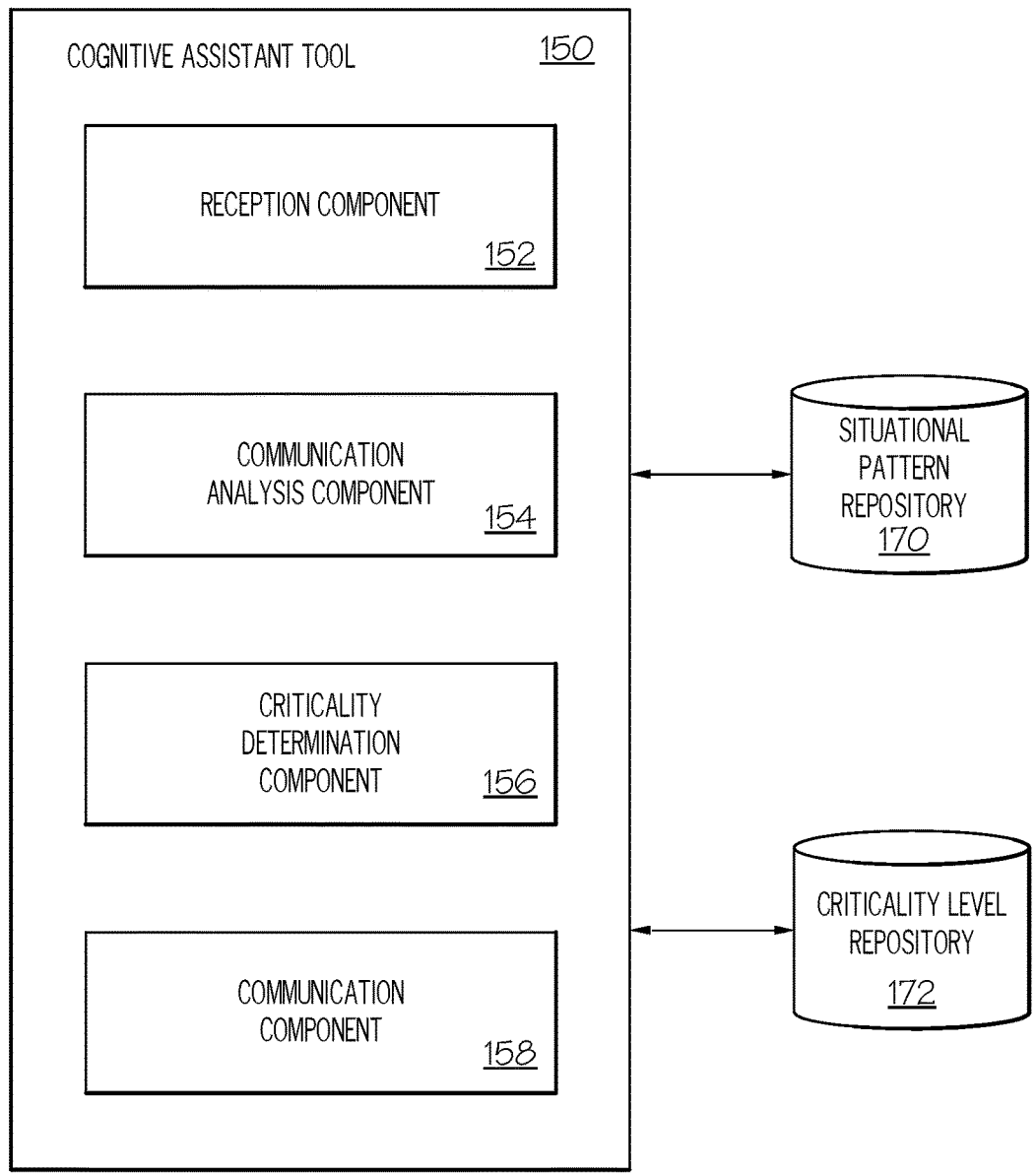
FIG. 3 shows an example cognitive assistant tool 150 according to illustrative embodiments.

Referring now to FIG. 3, cognitive assistant tool 150 for managing an incoming communication by determining a criticality level of the incoming communication and providing a prompt to a user based on the criticality level is shown. In an exemplary embodiment, recipient communication device 56 may employ a cognitive assistant tool (hereinafter "system 150"). As depicted, system 150 is shown within computer system/server 12. In general, system 150 can be implemented as program/utility 40 on computer system 12 of FIG. 1 and can enable the functions recited herein. It is further understood that system 150 may be incorporated within or work in conjunction with any type of system that receives, processes, and/or executes commands with respect to IT resources in a networked computing environment. Such other system(s) have not been shown in FIG. 3 for brevity purposes.

Reception component 152 of system 150, as executed by computer system/server 12, is configured to receive an incoming communication via a communication channel to a recipient communication device (e.g., recipient communication device 56). As referred to herein, a communication channel may include, but is not limited to, a medium or channel through which an incoming communication is expressed. A communication channel may include any of various wired and/or wireless technologies available for accessing networks, such as the Internet. For example, state-of-the art smartphones can access the Internet using 3G, 4G, WiFi, and similar wireless technologies. Additionally, wireless technologies enable interconnectivity among two or more devices. Such technologies include Near Field Communication (NFC), WiFi Direct, Bluetooth, and others. As referred to herein, an incoming communication may include, but are not limited to, a voice call, video call, voice message, video message, short message service (SMS) message (e.g., text message), multimedia messaging service (MMS) message (e.g., video message), instant message (e.g., chat message), push message from a mobile application, or the like.

Communication analysis component 154 is configured to analyze the incoming communication to determine, based on a context of the incoming communication, a situational pattern from among a plurality of situational pattern models related to the incoming communication in order to identify a criticality level. As used herein, a situational pattern relates to a context or topic of the incoming communication including any circumstances or facts that surround a particular event, situation, etc. In one embodiment, Natural Language Processing (NLP) is used to determine a context related to the incoming communication. Based on the determined context, communication analysis component 154 may determine a situational pattern from among possible situational pattern model candidates to identify a criticality of the incoming communication.

Communication analysis component 154 may be executed in conjunction with a situational pattern repository 170. Situational pattern repository 170 may be a database residing on any suitable computing device comprising non-transitory machine-readable storage media that stores situational pattern models. An incoming message may be compared against situational pattern model candidates stored in situational pattern repository 170. That is, communication analysis component 154 may determine a context based on the terms in the incoming communication, and compare the context against predefined situational pattern models stored in the situational pattern repository 170.

In an embodiment, communication analysis component 154 may then compute a likelihood score representing the likelihood that the determined context pertains to a certain situational pattern model, based on comparing the context against each of the situational pattern models stored in the situational pattern repository 170. A comparison between features of a situational pattern model candidate and an incoming message yielding a score above a determined threshold may indicate that the situational pattern model being compared is actually referenced in the incoming communication.

In an embodiment, a situational pattern model may specify word orders and word models to improve context accuracy. The models accomplish this by describing words and their relationship to other words, thus determining word meaning by contextual interpretation in a specific field or topic. Take for example, the phrase "Our electric bill is 7 days past due." A situational pattern model for financial concerns may indicate the likelihood of the word "bill" being associated with "due," and that a length of time, such as "7 days" is likely to be found near the words "past" or "over." By interpreting the context of the words, via a situational pattern model, a communication analysis component 154 would analyze the phrase, interpret a single object, i.e. the bill, and realize that the remaining words are adjectives or traits describing the type of bill. Topics for situational pattern models vary widely, and may include any topic area of concern or interest to a user—both broad and narrow.

FIG. 4A illustrates an example data structure 240 for implementing situational pattern repository 170. Data structure 240 includes a situational pattern identifier (ID), situational pattern, and a criticality level ID. The criticality level ID is a key to criticality level repository 172 which is discussed in greater detail below. As shown, the data rows in situational pattern repository 170 include seven separate situations/events of varying criticality and urgency.

Criticality identification component 156 of system 150, as executed by computer system/server 12, is configured to identify a criticality level related to the incoming communication based on a derived situational pattern. In one embodiment, a criticality level may include a range of predefined values. For example, a criticality level range from 1 to 3 may be defined. A criticality level within the range may be assigned to an incoming message, with a value of 1 assigned to an urgent incoming message requiring immediate attention. A value of 2 may be assigned to an incoming message which is important, but does not require an immediate response. A value of 3 may be assigned to an incoming message having no urgency to which a response can be deferred until a later time.

In some embodiments, a user may create a new situational pattern or modify an existing situational pattern via a user interface. The user interface may present a plurality of interactive web pages rendered by a web browser on a user device and the user may create and/or configure portions of a situational pattern by interacting with one or more fields presented on the plurality of interactive web pages. In an embodiment, a set of situational pattern templates may be provided to the user which can be modified by the user.

Criticality identification component 156 may be executed in conjunction with a criticality level repository 172. Criticality level repository 172 may be a database residing on any suitable computing device comprising non-transitory machine-readable storage media that stores criticality level data. Based on a derived situational pattern, a criticality level can be determined. In an embodiment, each criticality level may be associated with a predefined prompt. The predefined prompt may include text and/or a predefined color.

FIG. 4B illustrates an example data structure 250 for implementing criticality level repository 172. Data structure 250 includes a criticality level ID, criticality level, text prompt, and color prompt. The criticality level ID is a key to situational pattern repository 170. As shown, the data rows in criticality level repository 172 include three levels described by a related text prompt and color prompt. The most critical/urgent level includes text prompt value 'Urgent' with color prompt value 'Red'. Situational patterns related to this level may include an occurrence of an event requiring immediate or prompt attention, such as an accident (e.g., car accident, a train accident, etc.), a health emergency (e.g., a heart attack, broken bone, etc.), a security event (e.g., an assault, etc.), a car broken down, or the like, affecting a family member or friend.

The next critical/urgent level includes text prompt value 'Important' with color prompt value 'Yellow'. Situational patterns related to this event may include an occurrence of an event that may be important to the user but likely doesn't require immediate attention, such as a financial event (e.g., an overdue bill, etc.), an arrival of a family member at the user's home, or the like. The lowest level includes text prompt value 'Normal' with color prompt value 'Green'. Situational patterns related to his level may include normal conversational situations, such as information related to a past or future event (e.g., upcoming sporting event or concert, etc.), general greetings, casual conversation, or the like. In these situations, a user can respond at the next available opportunity but does not need to interrupt what he/she is currently doing to respond.

In some embodiments, similar to a situational pattern, a user may create a new criticality level or modify an existing criticality level via a user interface. The user interface may present a plurality of interactive web pages rendered by a web browser on a user device and the user may create and/or configure portions of a criticality level by interacting with one or more fields presented on the plurality of interactive web pages. In an embodiment, a set of criticality level templates may be provided to the user which can be modified by the user.

Based on a derived situational pattern of an incoming communication, a criticality level ID in situational pattern repository 170 is used to identify a criticality level, text prompt, and text color in criticality level repository 172. For example, situational pattern 'Admitted to Hospital' has a criticality level ID equal to 100. The criticality level ID is used to identify a row in criticality level repository 172 having critical level equal to 1, text prompt 'Urgent', and color prompt 'Red'.

Figure 5:
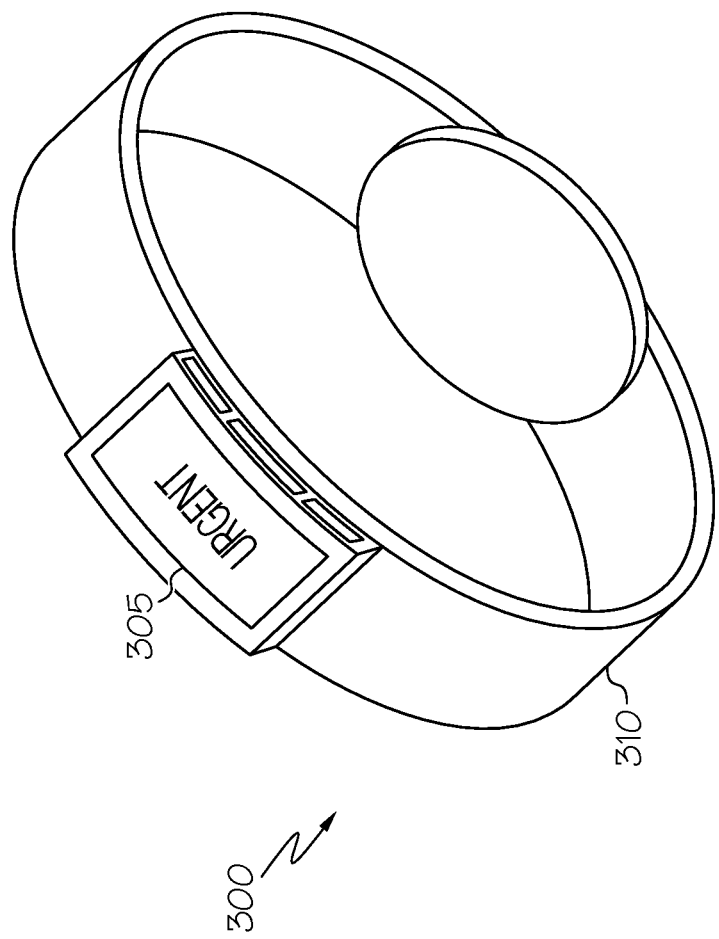
FIG. 5 shows an example wearable device 300 according to illustrative embodiments.

Communication component 158 of system 150, as executed by computer system/server 12, is configured to transmit a text prompt and/or color prompt for display to a device, such as a wearable device, associated with a user receiving an incoming communication. A wearable device refers to an electronic technology or computer which can comfortably be worn on the body. FIG. 5 illustrates an example wearable device 300 which may operate in conjunction with cognitive assistant tool 150 to assist a user with managing incoming communications. In an embodiment, a wearable device 300 includes a display element 305 and a strap 310 that forms the body of the wearable device 300. The strap 310 can secure the wearable device 300 around a person's wrist. Differently sized straps 310 can secure the wearable device 300 around other body parts such as an arm, ankle, leg, or around an inanimate object.

The wearable device 300 may incorporate lightweight, flexible components that enable the device to conform to a given contour. The wearable device 300 may safely undergo flexing of the type and magnitude normally experienced by watches, anklets, etc., during physical activity. In an embodiment, display element 305 may extend the full length of strap 310. In another embodiment, display element 305 may only extend only a partial length of strap 310. In an embodiment, display element 305 can be configured to display various information (e.g., text, time, icons indicating status of the wearable electronic device, etc.) and one of various colors.

In an embodiment, display element 305 is capable of displaying one of various colors referenced by the color prompt values in criticality level repository 172. For example, display element 305 may include one or more light emitting diodes (LEDs) connected to an electric circuit fed by a micro-battery for a wide range of illumination effects, and more particularly effects where the emitted light flux is controlled and capable of providing a range of programmed light displays, such as one of various colors. The color to be display may be determined by cognitive assistant tool 150 including the colors referenced in criticality level repository 172. In addition, display element 305 may further be capable of displaying text provided by cognitive assistant tool 150, such as the text prompt values defined in criticality level repository 172.

FIG. 6, in conjunction with FIGS. 3-5, an implementation of a process flowchart 600 for managing an incoming communication by determining a criticality level of the incoming communication and providing a prompt to a user based on the criticality level will now be described with reference to the mother/son example mentioned earlier. A mother sends a text message from her smart phone (i.e., sender communication device 54) to her son on his smart phone (i.e., recipient communication device 56). The text reads "Son, my heart is not feeling right. I was just got admitted to the hospital. Call me please."

At step 602, reception component 152 receives the incoming communication (i.e., the text message). At step 604, communication analysis component 154 analyzes the incoming communication to determine a context related to the incoming communication in order to identify a criticality level. In an embodiment, NLP techniques may be used to derive the context of the incoming message based on the terms used in the message. Based on the determined context, communication analysis component 154 determines possible situational pattern model candidates based on the terms appearing in the incoming communication. In the mother/son example, communication analysis component 154 determines situational pattern 'Admitted to Hospital' from situational pattern repository 170 based on the context of the incoming communication.

At step 606, criticality identification component 156 identifies a criticality level based on the situational pattern. In an embodiment, a predefined default prompt (e.g., color of white) or no prompt may be provided to communication component 158 when a situational pattern is not determined. In another embodiment, communication component 158 transmits a text prompt and/or color prompt for display to a device based on the identified criticality level. Referring back to the mother/son example, criticality identification component 156 identifies this as a criticality level 1 situation from criticality level repository 172 based on the determined situational pattern. The identified criticality level includes text prompt 'Urgent' and color prompt 'red'. Communication component 158 transmits this information for display on display element 305 of wearable device 300. The notification alerts the son to immediately stop whatever he is doing and contact his mother due to her emergency situation.

Process flowchart 600 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

In an embodiment, a user may install cognitive assistant tool 150 on recipient communication device 56 from one of several digital distribution platforms (e.g., the Apple® App Store™ for iOS™ devices, the Android™ Marketplace for Android™ OS devices, or the like). Once the cognitive assistant tool 150 has been installed on recipient communication device 56, the user may utilize a cognitive assistant service for managing incoming communications based on a determined criticality level of each incoming message.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for managing an incoming communication by determining a criticality level of the incoming communication and providing a prompt to a user based on the criticality level. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for managing an incoming communication by determining a criticality level of the incoming communication and providing a prompt to a user based on the criticality level. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for managing an incoming communication by determining a criticality level of the incoming communication and providing a prompt to a user based on the criticality level. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for managing communications, the method comprising:
  receiving an incoming communication to a user on a communication device of the user from another individual over a communication channel, the incoming communication having a natural language-based message to the user from the other individual;
  analyzing, using a cognitive system, language of the natural language-based message in the incoming communication received from the other individual to determine a context of the incoming communication, wherein the analyzing includes performing Natural Language Processing (NLP) on the natural language-based message to determine the informational content communicated by the incoming communication and determining the context based on the informational content;
  determining, based on the context of the incoming communication, a situational pattern selected from among a plurality of situational pattern model candidates in a situational pattern repository, the situational pattern being a real-world event that is indicated by the context of the natural language-based message from the other individual;
  identifying, based on the determined situational pattern, a criticality level; and
  transmitting, for display on a wearable device of the user, one or more prompts from among a plurality of prompts to the wearable device that are based on the criticality level.

2. The computer-implemented method of claim 1, wherein the one or more prompts is selected from a group consisting of text, a color, a symbol, and an icon.

3. The computer-implemented method of claim 1, wherein the wearable device is a smart watch.

4. The computer-implemented method of claim 1, further comprising configuring the plurality of situational patterns.

5. The computer-implemented method of claim 1, further comprising configuring the plurality of prompts.

6. The computer-implemented method of claim 1, wherein the communication device is selected from a group consisting of a smart phone, a cellular phone, a Voice over Internet Protocol (VoIP) phone, a personal data assistant (PDA), a personal entertainment device, and a tablet.

7. The computer-implemented method of claim 1, wherein the incoming communication is selected from a group consisting of a voice call, video call, voice message, video message, short message service (SMS) message, multimedia messaging service (MMS) message, instant message, and a push message from a mobile application.

8. A computer program product for managing communications, the computer program product comprising a computer readable storage device having program instructions embodied therewith, the program instructions executable by a processor to:
  receive an incoming communication on a communication device of a user from another individual over a communication channel, the incoming communication having a natural language-based message to the user from the other individual;
  analyze, using a cognitive system, language of the natural language-based message in the incoming communication received from the other individual to determine a context of the incoming communication, wherein the analyzing includes performing Natural Language Processing (NLP) on the natural language-based message to determine the informational content communicated by the incoming communication and determining the context based on the informational content;
  determine, based on the context of the incoming communication, a situational pattern selected from among a plurality of situational pattern model candidates in a situational pattern repository, the situational pattern being a real-world event that is indicated by the context of the natural language-based message from the other individual;
  identify, based on the determined situational pattern, a criticality level; and
  transmit, for display on a wearable device of the user, one or more prompts from among a plurality of prompts to the wearable device based on the criticality level.

9. The computer program product of claim 8, wherein the one or more prompts is selected from a group consisting of text, a color, a symbol, and an icon.

10. The computer program product of claim 8, wherein the wearable device is a smart watch.

11. The computer program product of claim 8, further comprising computer instructions to configure the plurality of situational patterns.

12. The computer program product claim 8, further comprising configuring the plurality of prompts.

13. The computer program product of claim 8, wherein the communication device is selected from a group consisting of a smart phone a cellular phone, a Voice over Internet Protocol (VoIP) phone, a personal data assistant (PDA), a personal entertainment device, and a tablet.

14. The computer program product of claim 8, wherein the incoming communication is selected from a group consisting of a voice call, video call, voice message, video message, short message service (SMS) message, multimedia messaging service (MMS) message, instant message, and a push message from a mobile application.

15. A computer system for managing communications, the computer system comprising:
  a memory medium comprising program instructions;
  a bus coupled to the memory medium; and
  a processor for executing the program instructions, the instructions causing the system to:
    receive an incoming communication on a communication device of a user from another individual over a communication channel, the incoming communication having a natural language-based message to the user from the other individual;
    analyze, using a cognitive system, language of the natural language-based message in the incoming communication received from the other individual to determine a context of the incoming communication, wherein the analyzing includes performing Natural Language Processing (NLP) on the natural language-based message to determine the informational content communicated by the incoming communication and determining the context based on the informational content;
    determine, based on the context of the incoming communication, a situational pattern selected from among a plurality of situational pattern model candidates in a situational pattern repository, the situational pattern being a real-world event that is indicated by the context of the natural language-based message from the other individual;

identify, based on the determined situational pattern, a criticality level; and transmit, for display on a wearable device of the user, one or more prompts from among a plurality of prompts to the wearable device based on the criticality level.

16. The computer system of claim 15, wherein the one or more prompts is selected from a group consisting of text, a color, a symbol, and an icon.

17. The computer system of claim 15, wherein the wearable device is a smart watch.

18. The computer system of claim 15, further comprising computer instructions to configure the plurality of situational patterns.

19. The computer system claim 15, further comprising configuring the plurality of prompts.

20. The computer system of claim 15, further comprising computer instruction to analyze the incoming communication is analyzed using Natural Language Processing techniques.

* * * * *